(12) United States Patent
Li et al.

(10) Patent No.: US 10,269,138 B2
(45) Date of Patent: Apr. 23, 2019

(54) UAV INSPECTION METHOD FOR POWER LINE BASED ON HUMAN VISUAL SYSTEM

(71) Applicant: CHANGZHOU CAMPUS OF HOHAI UNIVERSITY, Changzhou, Jiangsu (CN)

(72) Inventors: Qingwu Li, Jiangsu (CN); Yunpeng Ma, Jiangsu (CN); Jinxin Xu, Jiangsu (CN); Yaqin Zhou, Jiangsu (CN); Feijia He, Jiangsu (CN)

(73) Assignee: CHANGZHOU CAMPUS OF HOHAI UNIVERSITY (CN)

( * ) Notice: Subject to any disclaimer, the term of this patent is extended or adjusted under 35 U.S.C. 154(b) by 113 days.

(21) Appl. No.: 15/555,408

(22) PCT Filed: Dec. 14, 2016

(86) PCT No.: PCT/CN2016/109778
§ 371 (c)(1),
(2) Date: Sep. 1, 2017

(87) PCT Pub. No.: WO2018/028103
PCT Pub. Date: Feb. 15, 2018

(65) Prior Publication Data
US 2018/0357788 A1    Dec. 13, 2018

(30) Foreign Application Priority Data

Aug. 11, 2016  (CN) .......................... 2016 1 0656038

(51) Int. Cl.
*G06T 7/73*   (2017.01)
*G06T 7/00*   (2017.01)
(Continued)

(52) U.S. Cl.
CPC ................ *G06T 7/74* (2017.01); *G06T 5/002* (2013.01); *G06T 7/00* (2013.01); *G06T 7/0002* (2013.01);
(Continued)

(58) Field of Classification Search
CPC .. G06T 5/002; G06T 7/13; G06T 7/74; G06T 7/55; G06T 7/337; G06T 7/0002;
(Continued)

(56) References Cited

U.S. PATENT DOCUMENTS 9,162,753 B1 * 10/2015 Panto ...................... B64C 19/00
2010/0268409 A1 * 10/2010 Vian ...................... G05D 1/104
701/24
(Continued)

OTHER PUBLICATIONS

Deng, Chuang et al., "Unmanned Aerial Vehicles for Power Line Inspection: A Cooperative Way in Platforms and Communications", Journal of Communications vol. 9, No. 9, Sep. 2014 (Year: 2014).*
(Continued)

*Primary Examiner* — John R Schnurr (57) ABSTRACT

This invention discloses a UAV inspection method for power line based on human visual system. Image preprocessing module preprocesses the power line image of the input system. Power line detection module uses human visual attention mechanism to complete segmentation of the power line in the image. Binocular image registration module uses SURF algorithm to provide exact match of the feature points. The obstacle detection and early warning module uses binocular visual principle to calculate the three-dimensional coordinates of the matching point and the power line. The result output and feedback module calculates the vertical distance from the matching point to the power line according to the information about the space coordinates to complete feedback of the information about the obstacle with a threat to the power line. The method can accurately
(Continued)

analyze the obstacle of power line in a quantitative manner, and the analysis result is stable and objective.

11 Claims, 7 Drawing Sheets

(51) Int. Cl.
*H02G 1/02* (2006.01)
*G06T 7/593* (2017.01)
*G06T 7/55* (2017.01)
*G06T 7/13* (2017.01)
*G06T 7/33* (2017.01)
*G06T 5/00* (2006.01)
*B64C 39/02* (2006.01)

(52) U.S. Cl.
CPC ............ *G06T 7/13* (2017.01); *G06T 7/337* (2017.01); *G06T 7/55* (2017.01); *G06T 7/593* (2017.01); *H02G 1/02* (2013.01); *B64C 39/024* (2013.01); *B64C 2201/127* (2013.01); *B64C 2201/146* (2013.01); *G06T 2207/10016* (2013.01); *G06T 2207/10021* (2013.01); *G06T 2207/10024* (2013.01); *G06T 2207/20036* (2013.01); *G06T 2207/20064* (2013.01); *G06T 2207/30136* (2013.01); *G06T 2207/30252* (2013.01)

(58) Field of Classification Search
CPC ............ G06T 7/593; G06T 7/00; G06T 2207/10016; G06T 2207/10021; G06T 2207/10024; G06T 2207/20036; G06T 2207/20064; G06T 2207/30136; G06T 2207/30252; H02G 1/02; B64C 39/024; B64C 2201/146
See application file for complete search history.

(56) References Cited

U.S. PATENT DOCUMENTS

| | | | | |
|---|---|---|---|---|
| 2012/0250010 | A1* | 10/2012 | Hannay | G01N 21/952 356/237.1 |
| 2012/0262708 | A1* | 10/2012 | Connolly | B64C 39/024 356/237.2 |
| 2015/0206025 | A1* | 7/2015 | Chen | G06T 5/00 382/202 |
| 2015/0210388 | A1* | 7/2015 | Criado | B64C 39/10 701/3 |
| 2017/0336806 | A1* | 11/2017 | Blanc-Paques | G08G 5/045 |
| 2018/0095478 | A1* | 4/2018 | van Cruyningen | G01S 17/89 |
| 2018/0314995 | A1* | 11/2018 | Katz | G06Q 10/0631 |

OTHER PUBLICATIONS

Li, Zhengrong et al., "Knowledge-based Power Line Detection for UAV Surveillance and Inspection Systems", 23rd International Conference and Vision Computing New Zealand, 2008 (Year: 2008).*

* cited by examiner

UAV INSPECTION METHOD FOR POWER LINE BASED ON HUMAN VISUAL SYSTEM

FIELD

This invention relates to an UAV inspection method for power line based on human visual system, which belongs to the field of digital image processing and power line automatic inspection.

BACKGROUND

With the vigorous development of China's economy, there are more and more demands for electric energy. In order to meet the increasing demand of electricity in China, measures shall be taken to continue to expand in the direction of power line, high voltage and large capacity. On the one hand, with the construction of a large number of power lines, the coverage becomes much broader, terrain conditions are more complex and diverse, and it is difficult to figure out how to solve the problem of providing cross-terrain line maintenance. On the other hand, the environment of the power lines also constantly changes with the region and time. The whole power line system is complex, and the hidden danger in some key link may affect the users' power supply and system's power supply safety, resulting in immeasurable economic losses and threatening the safety of life and property, so power line inspection shall be deemed as an important part of power system equipment maintenance.

High-voltage power line, that is, overhead line, refers to the power line which erects the wires on the pole and tower with insulators and power fittings, and is an important component of the power grid and power system, which is vulnerable to external impacts and damages. At present, the overhead line accidents mainly include accidents due to external damages, wind accidents, lightning accidents and accidents caused by aging of equipment. The so-called accidents due to external damages mainly refer to accidents caused by foreign objects entering non-safe areas or distance, such as forest trees, housing construction and power lines in other non-safe areas, which not only poses a threat to the safety of power lines, but also easily leads to electric shock in the obstacle itself, fire hazard and other accidents. According to relevant reports, accidents due to external damage account for about one-fourth of the total number of trips of the national power lines, causing enormous harm and economic loss to the society.

The traditional power line inspection mode is usually manual inspection, which requires large consumption of manpower resources, but under the circumstance with large coverage of power lines and diverse needs for the environment, manual power line inspection has low efficiency and poor timeliness, as a result of which it often cannot meet the requirements for coverage and timeliness of power line inspection. In addition, the traditional manual power line inspection mode is often based on human eye observation and determines according to the staff experience in the status of the power line. Given its excessive dependence on the staff's status and experience, it cannot give a quantitative analysis of the distance between the obstacle and the power line and tends to cause false and missed inspection, so it cannot meet the accuracy requirement for power line inspection.

SUMMARY

The technical problem to be solved by this invention is to provide an UAV inspection system for the power line with regard to the technology gap in the field of accident inspection due to external force in the current power lines, so as to improve the way of power line inspection and improve the inspection efficiency and accuracy.

To solve the technical problem, this invention provides an UAV inspection method for power line based on human visual system, which includes the following steps:

Step (1) for UAV vide capture, using UAV armed with binocular visual measuring equipment to obtain video images of distribution of the power line and environmental information on the power line;

Step (2) by an image preprocessing module, grabbing frames of a sequence of inputted vide images of the power line, and preprocessing current frame of the image, including image graying processing and DoG edge detection, in which, the DoG edge detection uses DoG results of different parameters to describe the image edge and applies the same processing to left visual image and right visual image in order;

Step (3) by a power line detection module, processing the preprocessed image based on mathematical morphology, selecting structural factors in the same direction as the power line to perform repeated dilation and corrosion processing on the image, removing image noise, and using human visual connected domain attention mechanism to select the largest linear connected domain so as to complete segmentation of the power line in the image;

respectively recording horizontal coordinate positions $(x_{dz1}, x_{dz2} \ldots x_{dzj})$ and $(x_{dy1}, x_{dy2} \ldots x_{dyj})$ of the power line in left visual image and right visual image, where $x_{dz1}, x_{dz2} \ldots x_{dzj}$ and $x_{dy1}, x_{dy2} \ldots x_{dyj}$ refer to the horizontal coordinate of a central point of a connected domain of j power lines in the left visual image and right visual image;

Step (4) by a binocular image registration module, providing registration for the left visual image and right visual image separately, using SURF algorithm to find feature points of the left and right visual edge images which have been preprocessed, obtaining descriptor of a current feature point, performing exact matching for the feature points and recording location information of the exact matching point in left and right visual images $(x_{z1}, y_{z1}) \sim (x_{y1}, y_{y1})$, $(x_{z2}, y_{z2}) \sim (x_{y2}, y_{y2}) \ldots (x_{zn}, y_{zn}) \sim (x_{yn}, y_{yn})$, of which n refers to the number of all feature points included in single image $x_{zn}, y_{zn}$ and $x_{yn}, y_{yn}$ refer to position coordinates of corresponding features points in the left and right visual images, respectively;

Step (5) by an obstacle detection and early warning module, based on the horizontal coordination position of the power line in left and right visual images $(x_{dz1}, x_{dz2} \ldots x_{dzj})$, $(x_{dy1}, x_{dy2} \ldots x_{dyj})$ and locations of the exact matching points in left and right visual images $(x_{z1}, y_{z1}) \sim (x_{y1}, y_{y1})$, $(x_{z2}, y_{z2}) \sim (x_{y2}, y_{y2}) \ldots (x_{zn}, y_{zn}) \sim (x_{yn}, y_{yn})$, using binocular visual principle to calculate three-dimensional space coordinates of the matching points and the power line, and calculating a vertical distance from the matching points to the power line according to the space coordinate information;

Step (6) by a result output and feedback module, feeding back obstacle information of an obstacle that threatens the power line, when the space vertical distance between the matching point and the power line is higher than a predetermined threshold, feeding back detailed information about the obstacle to a computer software interface and recording obstacle detection time and geographical location; when the space vertical distance between the matching point and the power line is lower than the predetermined threshold, not processing the current matching point; applying the same processing to all matching points in the current frame image, feeding back the obstacle information of all obtained frame images in order, and completing record of the obstacle information in an inspection process.

The beneficial effect achieved in this invention is that it uses the binocular visual technology to detect and analyze the external obstacles of the power line and it can provide a massive, rapid information search of the power lines mainly through the joint inspection of UAVs armed with binocular visual measuring equipment to obtain the image information about the power lines and equipment in real time and enable the expert system to complete the quantitative analysis of the faults and hidden dangers of the power lines. Compared to traditional manual inspection, UAV inspection is not bound by terrain, environment, state and other factors, and it can be used to monitor the distribution of power lines and the surroundings in real time and can use the binocular visual technology of human eye to provide a quantitative analysis and early warning of the power line distribution, fault and other problems, which is characterized by high inspection efficiency, versatility and good timeliness.

DETAILED DESCRIPTION

Figure 1:
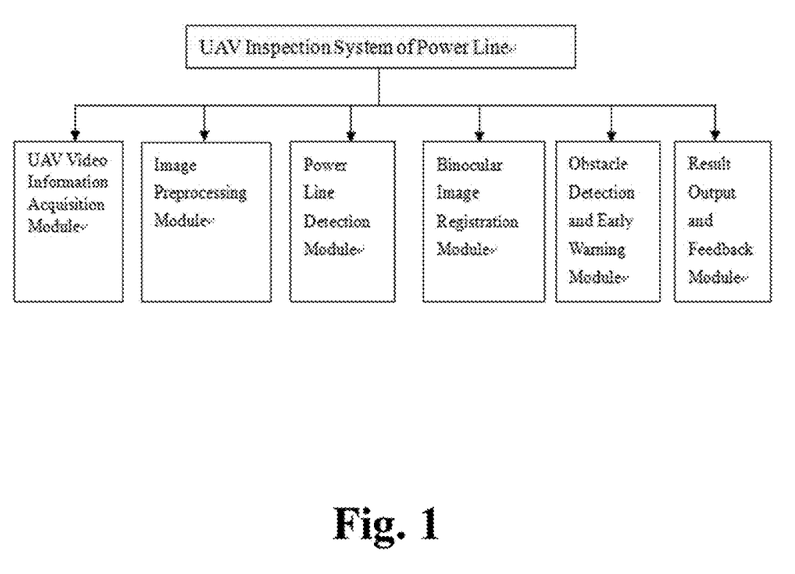
FIG. 1 is the Modular Structure Diagram of the UAV Inspection System for Power Line of the Invention.

The UAV inspection method for power line based on human visual system of this invention includes the hardware work system and software operating system, and the modules of the entire system are shown in FIG. 1, of which the software system includes the UAV video information capture module, while software system includes image preprocessing module, power line detection module, binocular image registration module, obstacle detection and early warning module and result output and feedback module.

Figure 2:
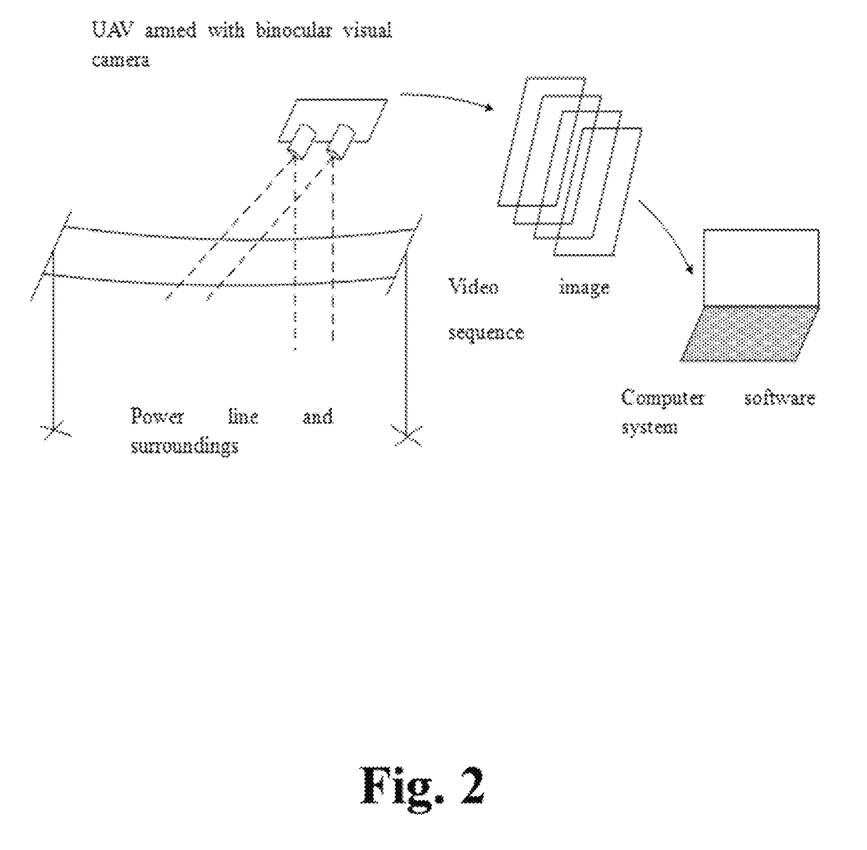
FIG. 2 is the Physical Model Diagram of the UAV Inspection System for Power Line of this Invention.

FIG. 2 shows the Physical Model Diagram, which first uses the UAV armed with binocular visual measuring equipment to acquire information about the power lines to be inspected and the surroundings and control the flight of the UAV, and the flight direction of UAV is in parallel with the distribution direction of power lines. It transmits the obtained binocular video sequence to the software operating system, which will extract the image frame at a certain interval from the video sequence to provide all image frames with image preprocessing, power line detection, left and right visual image registration, obstacle detection and early warning and result output and feedback in sequence to complete record and feedback of obstacle information in the process of UAV inspection.

Figure 3:
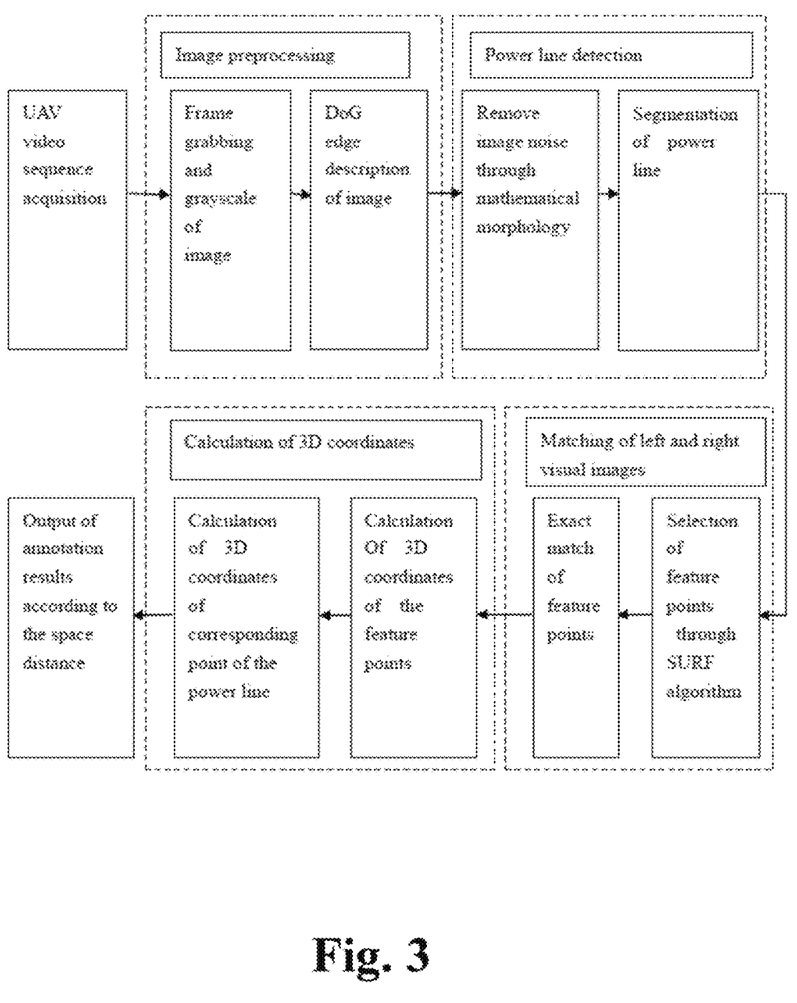
FIG. 3 is the Process Flow Chart of the UAV Inspection System for Power Line of this Invention.

With regard to the UAV inspection method for power line based on human visual system of this invention, the specific process is shown in FIG. 3:

(1) When it is required to detect the power line in some region, be sure to first use the UAV armed with binocular visual measuring equipment to inspect the power lines and the surroundings for acquisition of relevant information, of which the binocular visual measuring equipment consists of two cameras with same specifications, the camera pixel is not lower than 500 W, the parallax range b between two cameras for fixation is 120 mm and the focal length of the camera f is known as 400 mm≤f≤100 mm, and the two cameras are used to shoot in parallel in the same direction. The UAV is controlled by the staff, whose uniform flight direction is in parallel with the distribution direction of power lines, and it is uniform and stable in the flight. The binocular visual hardware system based on dual cameras shall be installed on a stable platform of the UAV, which will save the obtained left video sequence $l_z$ and right video sequence $l_y$ to the storage device to the UAV, and uses mobile wireless network to transmit to the software system.

(2) In the process of UAV inspection, it will transmit the obtained left video sequence $l_z$ and right video sequence $l_y$ from the UAV to the software system in real time, and the software system will first backup the data obtained in the data segment and the staff will enter the shooting time and location. With regard to processing of the left video sequence $l_z$ and right video sequence $l_y$, be sure to first continuously grab the frame separately from the left video sequence $l_z$ and right video sequence $l_y$ at a certain interval, which requires that all frames of images can be pieced together to recover the complete inspection image information and there is no information loss when adjacent frames are pieced together, so as to form the left image sequence $T_z$ and right image sequence $T_y$, of which both the left image sequence $T_z$ and right image sequence $T_y$ contain m frames of images, separately are $T_{z1}, T_{z2} \ldots T_{zm}$ and $T_{y1}, T_{y2} \ldots T_{ym}$. With regard to preprocessing of corresponding left and right visual images, be sure to first process the first left visual image $T_{z1}$ and the first right visual image $T_{y1}$, and then process the corresponding left and right visual images in sequence until the mth left visual image $T_{zm}$ and the mth right visual image $T_{ym}$ are processed.

Preprocessing the first left visual image $T_{z1}$ and the first right visual image $T_{y1}$ includes image grayscale processing and DoG (Difference of Gaussian) edge detection.

Grayscale processing of the said image turns color image into the single-channel grayscale image $H_{z1}$ of the first left visual image and the single-channel grayscale image of the first right visual image $H_{y1}$.

In the said DoG edge detection, Difference of Gaussian (DoG) is the difference of Gaussian function, which obtains the LPF results of a frame of image through convolution of the image of Gaussian function. Same as the Gaussian in the Gaussian low pass filter, the said Gaussian is a function, that is, normal distribution function. Difference of Gaussian, namely, difference of Gaussian function, is the difference of two Gaussian images. When it is specific to image processing, that is, subtract the results of Gaussian filter of the same frame of image under different parameters to obtain DoG image, that is, the edge detection result. In addition, DoG operation is defined as:

$$D = \frac{1}{2\pi} \left[ \frac{1}{\sigma_1^2} e^{-\frac{(x^2+y^2)}{2\sigma_1^2}} - \frac{1}{\sigma_2^2} e^{-\frac{(x^2+y^2)}{2\sigma_2^2}} \right] * H$$

$$= [G(x, y, \sigma_1) - G(x, y, \sigma_2)] * H$$

Where, D refers to the image result after processing, the first constant $\sigma_1=0.6$ and the second constant $\sigma_2=0.9$, x and y separately refer to the horizontal and vertical coordinates of the current pixel point in the image, the window size of the Gaussian filter function is 5×5, $G(x,y,\sigma_1)$ and $G(x,y,\sigma_2)$ separately refer to the Gaussian filter function of different parameters, H refers to grayscale image, "*" stands for the processing of the treatment of moving filter toward the whole frame of image, and the preprocessed images separately are the left visual edge image $D_{z1}$ and the right visual edge image $D_{y1}$.

(3) With regard to segmentation of the power line in the left visual edge image $D_{z1}$ and the right visual edge image $D_{y1}$, first use the loop erosion and dilation operation in mathematical morphology to process the left visual edge image $D_{z1}$ and the right visual edge image $D_{y1}$; the video capture direction is in parallel with the distribution direction of power lines, and the direction of power line in the image is in parallel wit the direction of 90° of the image. Image processing in morphology is to move a structural element in the image, and then apply intersection, union and other set operations to the left visual edge image $D_{z1}$ and the right visual edge image $D_{y1}$ with the structural element, of which structural element is the most important and fundamental concept, where B(x) stands for the structural element, and the erosion and dilation operation of each point A(x,y) in the work space E is defined as:

$X = E \otimes B = \{A(x,y): B(x) \subset E\}$  Erosion:

$Y = E \oplus B = \{A(x,y): B(y) \cap E \neq \Phi\}$  Dilation:

Where, $\subset$ stands for "included in", $\cap$ stands for "intersection operation" and $\Phi$ stands for null set. If the structural element B(x) is used to apply erosion to the work space E, the result is the set consisting of all points of the structural element B(x) included in the work space E after translation of the structural element B(x). If the structural element B(x) is used to apply dilation to the work space E, the result is the set consisting of all non-null set points of an intersection set of the structural element B and the work space E after translation of the structural element B. Select the linear structure factor with the length of 3 pixel points and the angle of 90°, apply erosion and dilation operation to the left visual edge image $D_{z1}$ and the right visual edge image $D_{y1}$, during which one loop operation includes two erosion operations and one dilation operation, which lasts for 20 times.

With regard to the image which has completed the loop erosion and dilation operation, measure the area and length of the area of the connected domain in the image, retain the line segment whose linear shape and area of the connected domain meet the threshold requirements, that is, the power line, remove the noise in the image, complete segmentation of the power line in the image and separately record the horizontal coordinate positions of $(x_{dz1}, x_{dz2} \ldots x_{dzj})$ and $(x_{dz1}, x_{dz2} \ldots x_{dzj})$ of the power line in the left visual edge image $D_{z1}$ and the right visual edge image $D_{y1}$, where the left visual edge image $D_{z1}$ and the right visual edge image $D_{y1}$ separately contain n power lines and record j horizontal coordinate positions.

(4) SURF algorithm is used to detect the feature points of the left visual edge image $D_{z1}$ and the right visual edge image $D_{y1}$. To make the registration feature have scale invariance, key points of the image shall be detected in the scale space. In addition, SURF algorithm is to filter boxes of different sizes on the original image to form the image pyramid of different scales.

(41) Use the rapid Hessian detector to extract the feature points, and Hessian matrix has good computing time and precision performance. With regard to certain point, the Hessian matrix under scale can be defined as shown in the formula below, while with regard to certain point (x,y) in the left visual edge image $D_{z1}$ and the right visual image $D_{y1}$, when the scale is $\sigma$, the Hessian matrix at the point shall be expressed as:

$$H(x, \sigma) = \begin{bmatrix} L_{xx}(x, \sigma) & L_{xy}(x, \sigma) \\ L_{xy}(x, \sigma) & L_{yy}(x, \sigma) \end{bmatrix}$$

Where, the function $L_{xx}(x,\sigma)$ refers to the second partial derivative of the Gaussian function on X-coordinate and the convolution of the left visual edge image $D_{z1}$ and the right visual edge image $D_{y1}$ and the point (x,y), and the formula is shown below:

$$L_{xx}(x, \sigma) = D * \frac{\partial^2}{\partial x^2} g(\sigma)$$

Description of $L_{xy}(x,\sigma)$ and $L_{yy}(x,\sigma)$ is separately shown in the formula below:

$$L_{xy}(x, \sigma) = D * \frac{\partial^2}{\partial x \partial y} g(\sigma)$$

$$L_{yy}(x, \sigma) = D * \frac{\partial^2}{\partial y^2} g(\sigma),$$

Figure 4:
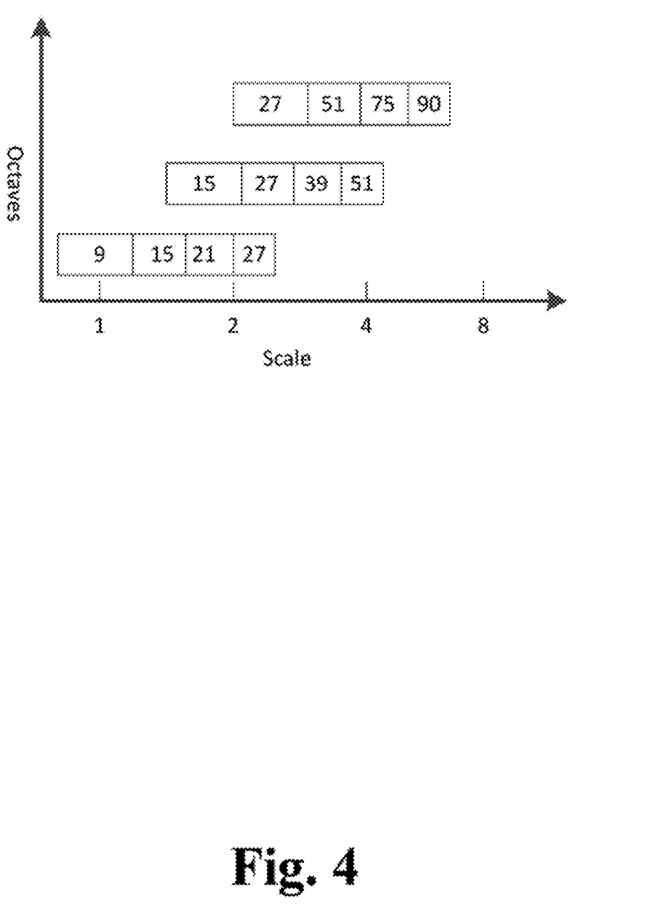
FIG. 4 is the Dimension Diagram of the Filter in the Scale Space.

$\partial$ refers to the operation to obtain the partial derivative, Where, the scale space of SURF algorithm is divided by group, images in each group are obtained after convolution of filters of different sizes, and the filter size will gradually increase. Assuming that the size of N×N, and the corresponding size is $\sigma=1.2 \times N/9$. In addition, the sizes of filters in different groups in the scale space are shown in FIG. 4, where horizontal coordinate stands for the changes in filter size while vertical coordinate stands for different groups.

To make the algorithm have the feature of invariant direction, SURF algorithm will re-specify the only direction for each interest point according to the information about the pixel point around the feature points, and the specific steps are as follows:

a) Take feature points as center to calculate the horizontal and vertical responses of Harr wavelet in the circular field with a radius of 6σ, of which the sampling step length is σ and the wavelet size is 4σ;

b) Take feature points as center to apply Gaussian weighting (2σ) to wavelet response, so that the weight value close to the feature point is large and that away from the feature point is small, and the new horizontal and vertical responses are obtained;

c) Finally, use a fan-shaped window with an angle of 60° to traverse the entire circle until the total response within the fan-shaped window is the strongest, at this time the direction within the fan-shaped window is the principal direction of the interest point.

(42) Set the feature point as the central point and construct a box with the size of 20σ along the principal direction of the central point, then divide the region into 16 small regions, calculate the wavelet response within each subregion (5σ× 5σ) and obtain the direction of 0° and the vector Σdx, direction of 90° and the vector Σdy, direction of 180° and the vector Σd|x| and direction of 180° and the vector Σd|y|, and then construct the 4D feature vector v=(Σdx,Σ|dx|,Σdy, Σ|dy|) to express each subregion, and finally form the 64D descriptor of the point.

Figure 6:
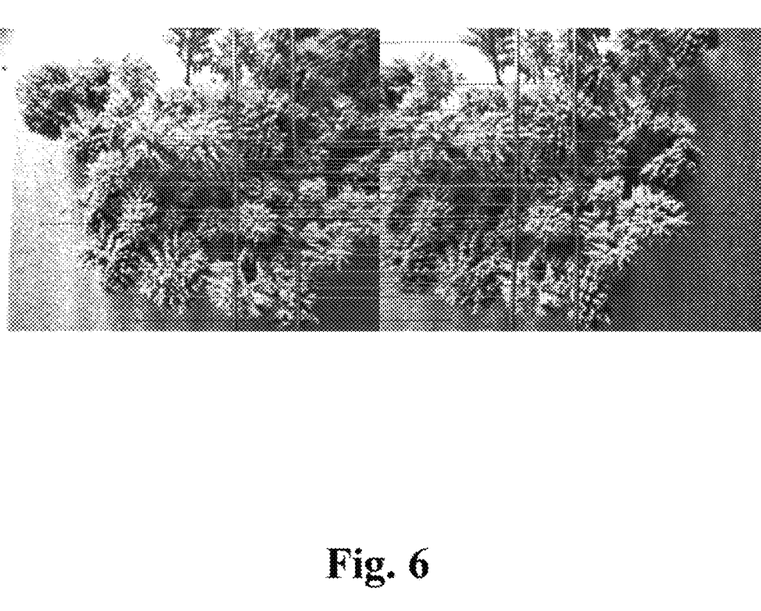
FIG. 6 is the Diagram of Matching of Features Points in the Left and Right Visual Images.

Assuming that the size of the left visual edge image $D_{z1}$ and the right visual edge image $D_{y1}$ are both M×N, and the images are placed horizontally at the same coordinate axis to form the image with the size of M×2N, and the matching of feature points in the left edge image and the right visual edge image are shown in FIG. 6. In addition, the set of feature points of the left visual edge image $D_{z1}$ and the right visual edge image $D_{y1}$ detected by the SURF method can be expressed as:

$$Pos1=\{(x'_1,y'_1),(x'_2,y'_2),\ldots,(x'_p,y'_p)\}$$

$$Pos2=\{(x_1,y_1),(x_2,y_2),\ldots,(x_q,y_q)\},$$

Where, p and q separately refer to the number of feature points of the left visual edge image $D_{z1}$ and the right visual edge image $D_{y1}$; according to the prior knowledge about the consistency of slope direction between the final correct matching points, the steps of the matching methods of the feature points of this invention are as follows:

a) With regard to each point i in the feature point set Pos1 of the left visual edge image, calculate the Euclidean distance of it from all points in the feature point set Pos2 of the right visual edge image, and select the corresponding point of the minimum Euclidean distance as the rough matching Point i;

b) Calculate the Euclidean distance of all rough matching point pair, sort the matching point pairs by the Euclidean distance in ascending order and delete the point pair with multiple points towards one point, at this time the feature points in the left visual edge image $D_{z1}$ and the right visual edge image $D_{y1}$ can be separately expressed as the feature point set Pos1' of the fixed (corrected) left visual edge image and the feature point set Pos2' of the fixed right visual edge image;

c) Select the first $K_1$ pairs of matching points in the feature point set Pos1' of the fixed left visual edge image and the feature point set Pos2' of the fixed right visual edge image to express as $Pos\_K_1=\{\{(x'_1,y'_1),(x_1,y_1)\},\{(x'_2,y'_2),(x_2,y_2)\},\ldots,\{(x'_n,y'_n),(x_n,y_n)\}\}$, which is called Set1;

Select the first $K_2$ pairs of matching points in the feature point set Pos1' of the fixed left visual edge image and the feature point set Pos2' of the fixed right visual edge image to express as $Pos\_K_2$, where $Pos\_K_2=\{\{(x'_1,y'_1),(x_1,y_1)\},\{(x'_2,y'_2),(x_2,y_2)\},\ldots,\{(x'_{K_2},y'_{K_2}),(x_{K_2},y_{K_2})\}\}$, is called as Set 2, where $K_1<K_2$;

d) With regard to all the point pairs in Set 2, calculate the slope between two points as shown in the formula below, and round it to form Slope Set k: $k=\{k_1,k_2,\ldots,k_w\}$, $$k_w = \frac{y_w}{x_w - x'_w}, \quad 1 \le w \le K_2;$$

e) Calculate the frequency of each slope in Slope Set k, screen the slope with the frequency of greater than and equal to 2 to form a new set $k\_new=\{k_1,k_2,\ldots,k_t\}$, where t refers to the total quantity of feature points obtained; if the frequency of each slop in Slope Set k is 1, select the slope of the first $2K_2/3$ pairs of points to form a new set k_new;

f) Traverse and calculate the slope of all point pairs in the feature point set Pos1' of the fixed left visual edge image and the feature point set Pos2' of the fixed right visual edge image, and screen all the point pairs with the slope falling between the interval of $[k_t-0.5,k_t+0.5]$ to form the point pair set $$Pos\_K_3=\{\{(x_{z1},y_{z1}),(x_{y1},y_{y1})\},\\ \{(x_{z2},y_{z2}),(x_{y2},y_{y2})56,\ldots\{(x_{zn},y_{zn}),(x_{yn},y_{yn})\}\},$$

where $k_t \in k\_new$.

Figure 5:
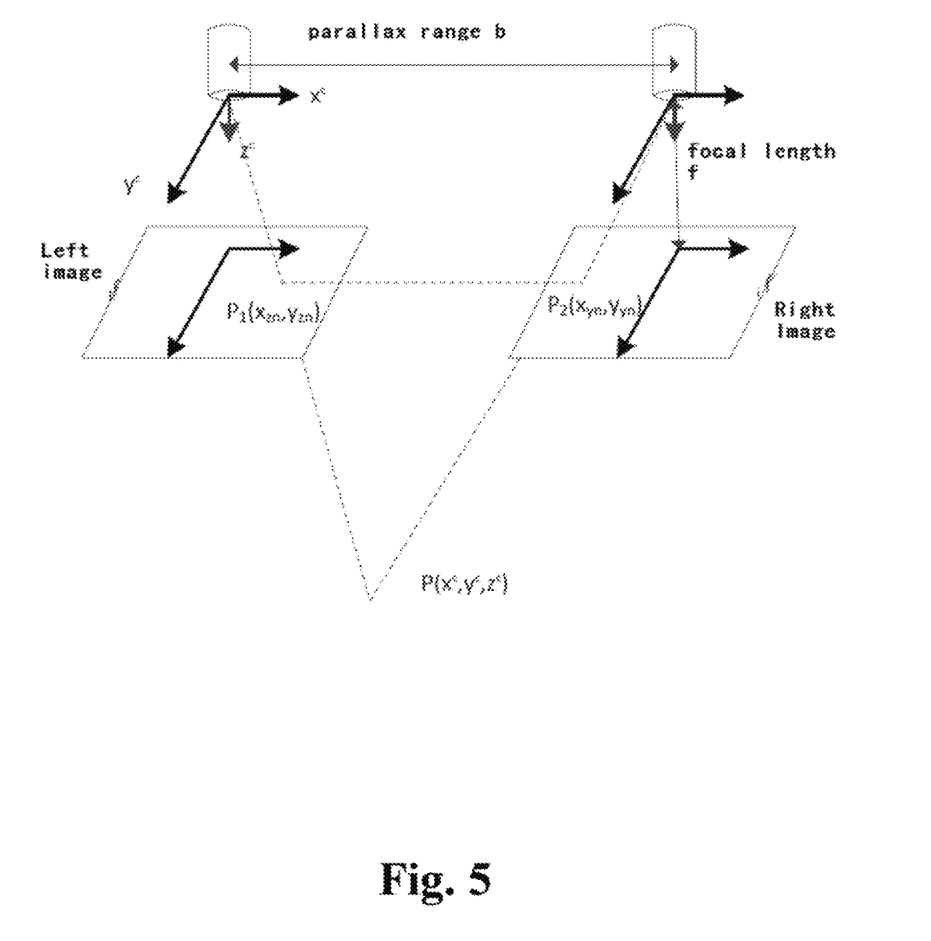
FIG. 5 is the Schematic Diagram of Binocular Vision Imaging.

(5) The binocular visual imaging principle is as shown in FIG. 5, the known focal length of the binocular visual camera is b=120 mm and the known focal length of the camera is f(400 mm≤f≤1000 mm), and the parallax d is defined as the position difference of certain point between the corresponding points in two images:

$$d=(x_{zn}-x_{yn})$$

Where, $x_{zn},x_{yn}$ separately refer to the horizontal coordinates of the matching point in the left visual image and right visual image, so as to calculate the space coordinates of certain point P in the left camera coordinate system as:

$$\begin{cases} x^c = \frac{b \cdot x_{zn}}{d} \\ y^c = \frac{b \cdot y_{zn}}{d} \\ z^c = \frac{b \cdot f}{d} \end{cases}$$

Where, $(x^c,y^c,z^c)$ is the position information about the current matching point in the space coordinate and $y_{zn}$ is the vertical coordinate of the matching point in the left and right visual images. Calculate the coordinates of all matching points in the left camera coordinate system according to the formula above, and then calculate the space coordinate of the point on the power line with the minimum Euclidean distance from the space of the matching point according to the formula above and the obtained horizontal coordinate positions of the power line $(x_{dz1},x_{dz2}\ldots x_{dzn})$ and $(x_{dy1},x_{dy2}\ldots x_{dyn})$; where the points defined on the 2D coordinate system with the same vertical coordinate have the minimum Euclidean distance from the space of the matching point, then directly give the vertical coordinate of the matching point to the corresponding point on the power line to form a corresponding point of the power line $Pos\_D=\{\{(x_{dz1},y_{z1}),(x_{dy1},y_{y1})\},\{(x_{dz2},y_{z2}),(x_{dy2},y_{y2})\},\ldots,\{(x_{dzn},y_{zn}),(x_{dyn},y_{yn})\}\}$ with the point pair set $Pos\_K_3=\{\{(x_{z1},z_{z1}),(x_{y1},y_{y1})\},\{(x_{z2},y_{z2}),(x_{y2},y_{y2})\},\ldots,\{(x_{zn},y_{zn}),(x_{yn},y_{yn})\}\}$, thus to calculate the space coordinate $(x^d,y^d,z^d)$ of certain point D on the power line in the left camera coordinate system.

(6) Calculate the Euclidean distance J of the matching point from the space of the power line after the space coordinates of Point P and Point D are obtained, and J is defined as $$J=\sqrt{(x^c-x^d)^2+(y^c-y^d)^2+(z^c-z^d)^2}$$

Figure 7:
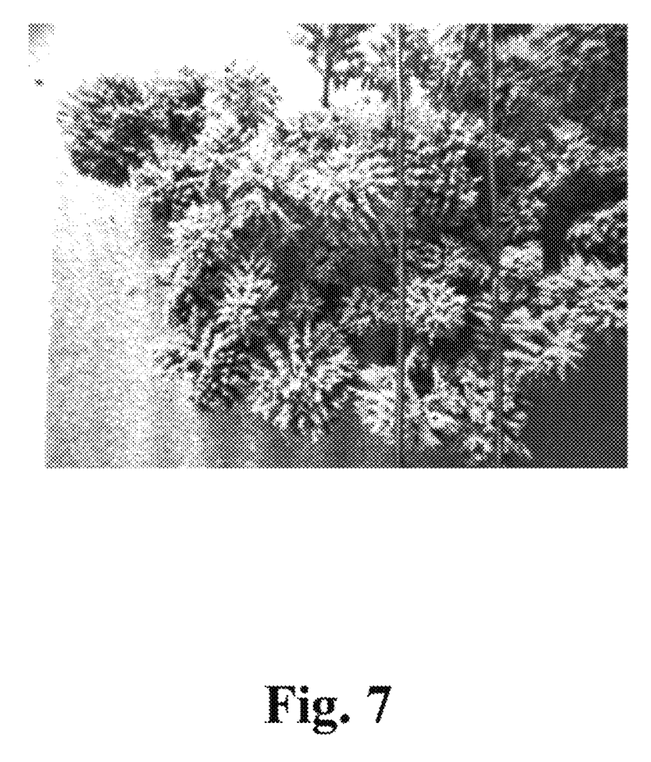
FIG. 7 is the Diagram of Annotations of Accident Points Due to External Force in the Left Visual Image.

Calculate the Euclidean distance of all matching points in the current frame of image from the space of the power line in sequence and compare with the predetermined distance empirical threshold. If J is greater than the threshold, complete the annotation of the point in the left visual image, complete feedback of the information about the obstacle which poses a threat to the power line, back feed the specific information about the obstacle on the computer software interface, record the obstacle detection time and geographical location. When the space vertical distance between the matching point and the power line is lower than the given threshold, the current matching point shall not be processed and the same treatment shall be applied to all matching points in the current frame image. In addition, process the frames of images in the sequence frame image in all videos in sequence and complete record of the obstacle annotation and information in the inspection process.

What is claimed is:

1. A UAV inspection method for power line based on human visual system, comprising following steps:

Step (1) for UAV vide capture, using UAV armed with binocular visual measuring equipment to obtain video images of distribution of the power line and environmental information on the power line;

Step (2) by an image preprocessing module, grabbing frames of a sequence of inputted vide images of the power line, and preprocessing current frame of the image, including image graying processing and DoG edge detection, in which, the DoG edge detection uses DoG results of different parameters to describe the image edge and applies the same processing to left visual image and right visual image in order;

Step (3) by a power line detection module, processing the preprocessed image based on mathematical morphology, selecting structural factors in the same direction as the power line to perform repeated dilation and corrosion processing on the image, removing image noise, and using human visual connected domain attention mechanism to select the largest linear connected domain so as to complete segmentation of the power line in the image;

respectively recording horizontal coordinate positions $(x_{dz1},x_{dz2} \ldots x_{dzj})$ and $(x_{dy1},x_{dy2} \ldots x_{dyj})$ of the power line in left visual image and right visual image, where $x_{dz1},x_{dz2} \ldots x_{dzj}$ and $x_{dy1},x_{dy2} \ldots x_{dyj}$ refer to the horizonal coordinate of a central point of a connected domain of j power lines in the left visual image and right visual image;

Step (4) by a binocular image registration module, providing registration for the left visual image and right visual image separately, using SURF algorithm to find feature points of the left and right visual edge images which have been preprocessed, obtaining descriptor of a current feature point, performing exact matching for the feature points and recording location information of the exact matching point in left and right visual images $(x_{z1},y_{z1})\sim(x_{y1},y_{y1})$, $(x_{z2},y_{z2})\sim(x_{y2},y_{y2})$ . . . $(x_{zn},y_{zn})\sim(x_{yn},y_{yn})$, of which n refers to the number of all feature points included in single image $x_{zn},y_{zn}$ and $x_{yn},y_{yn}$ refer to position coordinates of corresponding features points in the left and right visual images, respectively;

Step (5) by an obstacle detection and early warning module, based on the horizontal coordination position of the power line in left and right visual images $(x_{dz1},x_{dz2} \ldots x_{dzj})$, $(x_{dy1},x_{dy2} \ldots x_{dyj})$ and locations of the exact matching points in left and right visual images $(x_{z1},y_{z1})\sim(x_{y1},y_{y1})$, $(x_{z2},y_{z2})\sim(x_{y2},y_{y2})$ . . . $(x_{zn},y_{zn})\sim(x_{yn},y_{yn})$, using binocular visual principle to calculate three-dimensional space coordinates of the matching points and the power line, and calculating a vertical distance from the matching points to the power line according to the space coordinate information;

Step (6) by a result output and feedback module, feeding back obstacle information of an obstacle that threatens the power line, when the space vertical distance between the matching point and the power line is higher than a predetermined threshold, feeding back detailed information about the obstacle to a computer software interface and recording obstacle detection time and geographical location; when the space vertical distance between the matching point and the power line is lower than the predetermined threshold, not processing the current matching point; applying the same processing to all matching points in the current frame image, feeding back the obstacle information of all obtained frame images in order, and completing record of the obstacle information in an inspection process.

2. The UAV inspection method UAV inspection method for power line based on human visual system according to claim 1, wherein, In Step (1), the binocular visual measuring equipment includes two video image capture equipments with the same specifications and parameters, which are arranged in left and right visual forms separately and acquire video image information at a fixed angle of view;

when the UAV armed with binocular visual measuring equipment is used for power line inspection, wireless remote control is applied to the UAV, so that the UAV can have uniform rectilinear movements on a path in parallel with the power line and above the power line, and the distribution direction of the power line in the capture video image sequence is in parallel with a flight direction of the UAV;

the captured power line video image includes left video sequence $l_z$ and right video sequence $l_y$, and data of the left video sequence $l_z$ and the right video sequence $l_y$ is stored in a storage device installed on the UAV, which are transmitted to the image preprocessing module of a software system via a mobile wireless network.

3. The UAV inspection method UAV inspection method for power line based on human visual system according to claim 1, wherein, In Step (2), the image preprocessing module processes the left video sequence $l_z$ and the right video sequence $l_y$, which first grabs the frame continuously from the left video sequence $l_z$ and the right video sequence $l_y$ separately at a certain interval, which requires that all frame images can be pieced together to recover a complete inspection image information and there is no information gap when adjacent frames are pieced together, so as to form the left image sequence $T_z$ and right image sequence $T_y$, of which the left image sequence $T_z$ and right image sequence $T_y$ contain m frames of images, separately are $T_{z1},T_{z2} \ldots T_{zm}$ and $T_{y1},T_{y2} \ldots T_{ym}$;

the image preprocessing module preprocesses corresponding frames of left and right visual images, and first processes the first frame of left visual image $T_{z1}$ and right visual image $T_{y1}$, and then processes the corresponding frame of the left and right visual images in sequence until the end of processing of No.m frame of left visual image $T_{zm}$ and No.m frame of left visual image $T_{ym}$.

4. The UAV inspection method UAV inspection method for power line based on human visual system according to claim 3, wherein, preprocessing the first frame of left visual image $T_{z1}$ and the first image of right visual image $T_{y1}$ includes image grayscale processing and DoG edge detection, the image grayscale processing turns color image into a single-channel grayscale image $H_{z1}$ of the first left visual image and a single-channel grayscale image of the first right visual image $H_{y1}$;

in the DoG edge detection, DoG operation was defined as:

$$D = \frac{1}{2\pi}\left[\frac{1}{\sigma_1^2}e^{-\frac{(x^2+y^2)}{2\sigma_1^2}} - \frac{1}{\sigma_2^2}e^{-\frac{(x^2+y^2)}{2\sigma_2^2}}\right]*H$$

$$= [G(x, y, \sigma_1) - G(x, y, \sigma_2)]*H$$

where, D refers to an image result after processing, $\sigma_1$ is first constant while $\sigma_2$ is second constant, x and y separately refer to horizontal and vertical coordinates of the current pixel point in the mage, $G(x,y,\sigma_1)$ and $G(x,y,\sigma_2)$ separately refer to Gaussian filter function of different parameters, H refers to a grayscale image, "*" means performing moving filter toward the whole frame of image, and the preprocessed images separately are the left visual edge image $D_{z1}$ and the right visual edge image $D_{y1}$.

5. The UAV inspection method UAV inspection method for power line based on human visual system according to claim 4, wherein,
in Step (3), the power line in the left visual edge image $D_{z1}$ and the right visual edge image $D_{y1}$ is segmented, B(x) represents structural element, and erosion and dilation operation of each point A(x,y) in work space E as defined as:

$$X=E\otimes B=\{A(x,y):B(x)\subset E\} \quad \text{Erosion:}$$

$$Y=E\oplus B=\{A(x,y):B(y)\cap E\neq \Phi\} \quad \text{Dilation:}$$

where, ⊂ stands for "included in", ∩ stands for "intersection operation" and Φ stands for null set. If the structural element B(x) is used to apply erosion to the work space E, the result is the set consisting of all points of the structural element B(x) included in the work space E includes a structural element B after translation of the structural element B, if the structural element B(x) is used to apply dilation to the work space E, the result is a set consisting of all non-null set points of an intersection set of the structural element B and the work space E after translation of the structural element B.

6. The UAV inspection method UAV inspection method for power line based on human visual system according to claim 5, wherein,
a linear structure factor with a length of 3 pixel points and an angle of 90° is selected, the erosion and dilation operation is applied to the left visual edge image $D_{z1}$ and the right visual edge image $D_{y1}$, during which one loop operation includes two erosion operations and one dilation operation, which lasts for 20 times.

7. The UAV inspection method UAV inspection method for power line based on human visual system according to claim 5, wherein,
for an image which has completed the loop of erosion and dilation operation, an area and a length of the connected domain in the image is measured, linear shape and the area of the connected domain are remained to meet threshold requirements, that is the power line, noise in the image is removed and segmentation of the power line in the image is completed, and the horizontal coordinate positions of $(x_{dz1},x_{dz2} \ldots x_{dzj})$ and $(x_{dz1}, x_{dz2} \ldots x_{dzj})$ of the power line in the left visual edge image $D_{z1}$ and the right visual edge image $D_{y1}$ are separately recorded, where the left visual edge image $D_{z1}$ and the right visual edge image $D_{y1}$ separately contain j power lines and record j horizontal coordinate positions.

8. The UAV inspection method for power line based on human visual system according to claim 7, wherein,
in Step (4), SURF algorithm is used to detect the feature points of the left visual edge image $D_{z1}$ and the right visual edge image $D_{y1}$, which comprises following steps:
step (41) using rapid hessian detector to extract the feature points, in which, with regard to certain point in the left visual edge image $D_{z1}$ and the right visual edge image $D_{y1}$, when a scale is σ, Hessian matrix at the point is expressed as:

$$H(x,\sigma) = \begin{bmatrix} L_{xx}(x,\sigma) & L_{xy}(x,\sigma) \\ L_{xy}(x,\sigma) & L_{yy}(x,\sigma) \end{bmatrix}$$

where, function $L_{xx}(x,\sigma)$ refers to the second partial derivative of Gaussian function on X-coordinate and a convolution of the left visual edge image $D_{z1}$ and the right visual edge image $D_{y1}$ at the point (x,y), which is defined as:

$$L_{xx}(x,\sigma) = D*\frac{\partial^2}{\partial x^2}g(\sigma)$$

description of $L_{xy}(x,\sigma)$ and $L_{yy}(x,\sigma)$ is separately shown in the formula below:

$$L_{xy}(x,\sigma) = D*\frac{\partial^2}{\partial x\partial y}g(\sigma)$$

$$L_{yy}(x,\sigma) = D*\frac{\partial^2}{\partial y^2}g(\sigma),$$

∂ refers to an operation to obtain partial derivative,
where, the scale space of SURF algorithm is divided by group, images in each group are obtained after convolution of filters of different sizes, and the filter size will gradually increase;
step (42) setting the feature point as a central point and constructing a box with a size of 20σ along the principal direction of the central point, then dividing this region into 16 sub-regions, calculating a wavelet response within each sub-region (5σ×5σ) and obtaining 0° direction, vector Σdx, 90° direction and vector Σdy, 180° direction and vector Σd|x| and 180° direction and vector Σd|y|, and then constructing a 4D feature vector v=(Σdx,Σ|dx|,Σdy,Σ|dy|) to express each sub-region, and finally forming a 64D descriptor of the point;
assuming that the size of the left visual edge image $D_{z1}$ and the right visual edge image $D_{y1}$ are both M×N, and the images are placed horizontally at the same coordinate axis to form an image with the size of M×2N, and a set of feature points of the left visual edge image $D_{z1}$ and the right visual edge image $D_{y1}$ detected by the SURF method is expressed as:

Pos1={$(x'_1,y'_1),(x'_2,y'_2),\ldots,(x'_p,y'_p)$}

Pos2={$(x_1,y_1),(x_2,y_2),\ldots,(x_q,y_q)$}, where, p and q separately refer to the number of feature points of the left visual edge image $D_{z1}$ and the right visual edge image $D_{y1}$; and feature point matching method includes the following steps:

step a) with regard to each point i in the feature point set Pos1 of the left visual edge image, calculating the Euclidean distance between each point i and all points in the feature point set Pos2 of the right visual edge image, and selecting a corresponding point of the minimum Euclidean distance as a rough matching point of Point i;

step b) calculating the Euclidean distance of all rough matching point pair, sorting the matching point pairs by the Euclidean distance in ascending order and deleting point pairs with multiple points towards one point, in which at this time the feature points in the left visual edge image $D_{z1}$ and the right visual edge image $D_{y1}$ are separately expressed as a feature point set Pos1' of fixed left visual edge image and a feature point set Pos2' of fixed right visual edge image;

step c) selecting the first $K_1$ pairs of matching points in the feature point set Pos1' of the fixed left visual edge image and the feature point set Pos2' of the fixed right visual edge image to express as Pos_$K_1$={{($x'_1,y'_1$),($x_1,y_1$)},{($x'_2,y'_2$),($x_2,y_2$)}, . . . , {($x'_n,y'_n$),($x_n,y_n$)}}, which is called Set 1;

selecting the first $K_2$ pairs of matching points in the feature point set Pos1' of the fixed left visual edge image and the feature point set Pos2' of the fixed right visual edge image to express as Pos_$K_2$, where Pos_$K_2$={{($x'_1,y'_1$),($x_1,y_1$)}, {($x'_2,y'_2$),($x_2,y_2$)}, . . . , {($x'_{K_2},y'_{K_2}$),($x_{K_2},y_{K_2}$)}}, is called as Set 2, where $K_1 < K_2$;

step d) with regard to all the point pairs in Set 2, calculating a slope between two points in a formula below, and rounding it to form a Slope Set k: k={$k_1, k_2, \ldots, k_w$}, $$k_w = \frac{y_w}{x_w - x'_w}, 1 \leq w \leq K_2;$$

step e) calculating a frequency of each slope in Slope Set k, screening the slope with the frequency of greater than and equal to 2 to form a new set k_new={$k_1, k_2, \ldots, k_t$}, where t refers to the total quantity of feature points obtained; if the frequency of each slop in Slope Set k is 1, selecting the slope of the first $2K_2/3$ pairs of points to form a new set k_new;

step f) traversing and calculating the slope of all point pairs in the feature point set Pos1' of the fixed left visual edge image and the feature point set Pos2' of the fixed right visual edge image, and screening all the point pairs with the slope falling between the interval of [$k_i-0.5,k_i+0.5$] to form the point pair set Pos_$K_3$={{($x_{z1},y_{z1}$),($x_{y1},y_{y1}$)},{($x_{z2},y_{z2}$),($x_{y2},y_{y2}$)}, . . . . {($x_{zn},y_{zn}$),($x_{ym},y_{ym}$)}}, where $k_i \in$ k_new.

9. The UAV inspection method UAV inspection method for power line based on human visual system according to claim 8, wherein, In step (41), the SURF algorithm re-specifies an only direction for each interest point according to information about pixel points around the feature points, which comprising following steps:

a) taking feature points as center to calculate the horizontal and vertical responses of Harr wavelet in a circular field with a radius of 6σ, of which a sampling step length is σ and a wavelet size is 4σ;

b) taking feature points as center to apply Gaussian weighting to wavelet response, so that a weight value close to the feature point is large and a weight value away from the feature point is small, and obtaining new horizontal and vertical responses;

c) using a fan-shaped window with an angle of 60° to traverse the entire circle until the total response within a fan-shaped window is the strongest, wherein at this time a direction within the fan-shaped window is the principal direction of the interest point.

10. The UAV inspection method UAV inspection method for power line based on human visual system according to claim 8, wherein, In Step (5), the parallax range between binocular visual camera is b, known focal length of camera is f and parallax d is defined as the position difference of certain point between corresponding points in two images;

$$d=(x_{zn}-x_{yn})$$

where, $x_{zn}$, $x_{yn}$ separately refer to the horizontal coordinates of the matching point in the left visual image and right visual image, so as to calculate the space coordinates of certain point P in the left camera coordinate system according to formula:

$$\begin{cases} x^c = \frac{b \cdot x_{zn}}{d} \\ y^c = \frac{b \cdot y_{zn}}{d} \\ z^c = \frac{b \cdot f}{d} \end{cases}$$

where, ($x^c,y^c,z^c$) is position information about the current matching point in the space coordinate and $y_{zn}$ is the vertical coordinate of the matching point in the left and right visual images, the coordinates of all matching points in the left camera coordinate system are calculated according to the formula, and then the space coordinate of the point on the power line with the minimum Euclidean distance from the space of the matching point are calculated according to the formula and the obtained horizontal coordinate positions of the power line ($x_{dz1},x_{dz2} \ldots x_{dzn}$) and ($x_{dy1},x_{dy2} \ldots x_{dyn}$); where the points defined on the 2D coordinate system with the same vertical coordinate have the minimum Euclidean distance from the space of the matching point, then directly give the vertical coordinate of the matching point to the corresponding point on the power line to form a corresponding point of the power line Pos_D={{($x_{dz1},y_{z1}$),($x_{dy1},y_{y1}$)},{($x_{dz2},y_{z2}$),($x_{dy2},y_{y2}$)}, . . . , {($x_{dzn},y_{zn}$),($x_{dyn},y_{ym}$)}} with the point pair set Pos_$K_3$={{($x_{z1},y_{z1}$),($x_{y1},y_{y1}$)},{($x_{z2},y_{z2}$),($x_{y2},y_{y2}$)}, . . . , {($x_{zn},y_{zn}$),($x_{ym},y_{ym}$)}}, thus to calculate the space coordinate ($x^d,y^d,z^d$) of certain point D on the power line in the left camera coordinate system.

11. The UAV inspection method UAV inspection method for power line based on human visual system according to claim 10, wherein, In Step (6), space Euclidean distance J between the matching point and the power line is calculated after the space coordinates of Point P and Point D are obtained, and J is defined as:

$$J=\sqrt{(x^c-x^d)^2+(y^c-y^d)^2+(z^c-z^3)^2}.$$

* * * * *